US012617006B2

(12) United States Patent
Guo et al.

(10) Patent No.: US 12,617,006 B2
(45) Date of Patent: May 5, 2026

(54) DEDUSTING APPARATUS, BATTERY MANUFACTURING DEVICE, AND DEDUSTING METHOD

(71) Applicant: CONTEMPORARY AMPEREX TECHNOLOGY (HONG KONG) LIMITED, Hong Kong (CN)

(72) Inventors: Yitai Guo, Ningde (CN); Zhihua Wen, Ningde (CN); Yunru Shi, Ningde (CN); Yongli Zhang, Ningde (CN); Cong Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/663,118

(22) Filed: May 14, 2024

(65) Prior Publication Data

US 2024/0293854 A1 Sep. 5, 2024

Related U.S. Application Data

(63) Continuation of application No. PCT/CN2022/078451, filed on Feb. 28, 2022.

(51) Int. Cl.
*B08B 13/00* (2006.01)
*B08B 7/04* (2006.01)
*B08B 15/04* (2006.01)

(52) U.S. Cl.
CPC ................ *B08B 15/04* (2013.01); *B08B 7/04* (2013.01)

(58) Field of Classification Search
None
See application file for complete search history.

(56) References Cited

FOREIGN PATENT DOCUMENTS

| | | | |
|---|---|---|---|
| CN | 202824091 | U | 3/2013 |
| CN | 206210921 | U | 5/2017 |
| CN | 108273804 | A | 7/2018 |
| CN | 110641755 | A | 1/2020 |
| CN | 110813534 | A | 2/2020 |
| CN | 212045422 | U | * 12/2020 |

(Continued)

OTHER PUBLICATIONS

Google Patents translation of CN110641755A (Year: 2025).*

(Continued)

*Primary Examiner* — Eric W Golightly
(74) *Attorney, Agent, or Firm* — K&L Gates LLP

(57) ABSTRACT

Disclosed are a dedusting apparatus, a battery manufacturing device, and a dedusting method. The dedusting apparatus is used for removing dust on the surface of a material belt, and includes a dust suction mechanism and a magnetic mechanism, wherein the magnetic mechanism is arranged opposite to the dust suction mechanism at an interval to form a gap for the material belt to pass through, and the magnetic mechanism is used for generating an alternating magnetic field. By arranging the magnetic mechanism and the dust suction mechanism opposite to each other on both sides of the material belt in the thickness direction, when the material belt passes through the gap between the magnetic mechanism and the dust suction mechanism, metal dust passing through the gap along with the material belt is affected by the alternating magnetic field and induced to form an eddy current.

10 Claims, 3 Drawing Sheets

(56) References Cited

FOREIGN PATENT DOCUMENTS

| | | | |
|---|---|---|---|
| CN | 212285134 | U | 1/2021 |
| CN | 112397687 | A | 2/2021 |
| CN | 213194852 | U | 5/2021 |
| CN | 113333164 | A | 9/2021 |
| JP | H11221611 | A | 8/1999 |
| JP | 2002217244 | A | 8/2002 |
| KR | 20150041975 | A | 4/2015 |

OTHER PUBLICATIONS

Google Patents translation of CN212045422U (Year: 2025).*

The extended European search report received in the counterpart European application 22927898.1, mailed on Dec. 20, 2024, 8 pages.

International Search Report received in the corresponding International Application PCT/CN2022/078451, mailed Sep. 16, 2022, 8 pages.

Written Opinion of ISA received in the corresponding International Application PCT/CN2022/078451, mailed Sep. 16, 2022, 5 pages.

Office Action (with English Machine Translation), mailed Oct. 22, 2025, for corresponding Chinese Patent Application Serial No. 202280029384.2, 12 pages.

Notice of Allowance, mailed Dec. 8, 2025, for corresponding European Patent Application Serial No. 22927898.1, 31 pages.

* cited by examiner

DEDUSTING APPARATUS, BATTERY MANUFACTURING DEVICE, AND DEDUSTING METHOD

CROSS-REFERENCE TO RELATED APPLICATION

The present application is a continuation of International Application No. PCT/CN2022/078451, filed Feb. 28, 2022 and entitled "DEDUSTING APPARATUS, BATTERY MANUFACTURING DEVICE, AND DEDUSTING METHOD", which is incorporated herein by reference in its entirety.

TECHNICAL FIELD

The present application relates to the field of dedusting technologies, and specifically, to a dedusting apparatus, a battery manufacturing device, and a dedusting method.

BACKGROUND

In a machining process of a material belt, the surface of the material belt needs to be dedusted and cleaned. Common dedusting methods include blower dedusting, negative pressure dedusting, and adhesion dedusting. Dust is easy to adhere to the surface of the material belt, and when the surface of the material belt has a coating layer, the dust is easily embedded in the coating layer and is difficult to remove. Especially for metal dust, it is difficult to effectively remove it by conventional dedusting methods.

SUMMARY OF THE INVENTION

The present application aims to provide a dedusting apparatus, a battery manufacturing device, and a dedusting method, so as to improve the dedusting effect of a material belt.

Embodiments of the present application are implemented as follows:

In the first aspect, the embodiments of the present application provide a dedusting apparatus for removing dust on the surface of a material belt, and including a dust suction mechanism and a magnetic mechanism, wherein the magnetic mechanism is arranged opposite to the dust suction mechanism at an interval to form a gap for the material belt to pass through, and the magnetic mechanism is used for generating an alternating magnetic field.

In the technical solution of the present application, by arranging the magnetic mechanism and the dust suction mechanism opposite to each other on both sides of the material belt in the thickness direction, when the material belt passes through the gap between the magnetic mechanism and the dust suction mechanism, metal dust passing through the gap with the material belt is affected by the alternating magnetic field and induced to form an eddy current, so that the metal dust generates an induced magnetic field opposite in direction to the original alternating magnetic field. Therefore, the metal dust is subjected to a repulsive force and bounces off from the material belt, and the dust suction mechanism sucks away the bounced metal dust, which effectively reduces the metal dust residue. At the same time, the dust suction mechanism is also capable of sucking away other dust with small weight, which effectively improves the dedusting effect.

In one embodiment of the present application, the magnetic mechanism includes a magnetic roller, and the magnetic roller, when rotating, generates the alternating magnetic field.

In the above technical solution, the rotation of the magnetic roller generates the alternating magnetic field, the overall structure is simple, and the reliability is high.

In one embodiment of the present application, the magnetic mechanism further includes a driving assembly, and the driving assembly is used for driving the magnetic roller to rotate.

In the above technical solution, by arranging the driving assembly to drive the magnetic roller to rotate actively relative to the material belt, it is ensured that the magnetic roller is capable of generating the alternating magnetic field and is high in reliability.

In one embodiment of the present application, the magnetic mechanism further includes a bypass roller, and the bypass roller is used for guiding the material belt to move. The bypass roller is of a hollow structure, the bypass roller rotatably sleeves the magnetic roller, and the gap is formed between the outer peripheral surface of the bypass roller and the dust suction mechanism.

In the above technical solution, on the one hand, the bypass roller rotates together with the material belt, thus achieving a good conveying effect. Moreover, the bypass roller separates the magnetic roller from the material belt, and the rotation of the magnetic roller does not affect conveying of the material belt, thereby ensuring stable conveying and effective dedusting of the material belt. On the other hand, the width of the material belt on the bypass roller will not be greater than the axial length of the bypass roller, that is, the axial length of the magnetic roller will not be less than the material belt, so that the material belt is entirely within a range of the alternating magnetic field of the magnetic roller in the width direction, thereby ensuring the dedusting effect.

In one embodiment of the present application, the magnetic mechanism further includes a first bearing, and the magnetic roller is connected to the bypass roller through the first bearing.

In the above technical solution, the first bearing is arranged to connect the magnetic roller and the bypass roller as a whole, the magnetic mechanism is compact in the overall structure and easy to mount, the friction between the magnetic roller and the bypass roller is small, the rotation is flexible, and the reliability is high.

In one embodiment of the present application, the magnetic mechanism further includes a mounting seat, both ends of the magnetic roller are rotatably connected to the mounting seat, and the driving assembly is fixedly connected to the mounting seat.

In the above technical solution, by arranging the mounting seat, the rotation of the magnetic roller is more stable, and the mounting seat is also capable of playing a role of shielding, so as to alleviate the problem of environmental pollution caused by the metal dust bouncing off to the external space, and ensure the dust suction effect of the dust suction mechanism.

In one embodiment of the present application, the dust suction mechanism includes a dust suction hood and a negative pressure apparatus, the dust suction hood has a dust suction port arranged towards the magnetic mechanism, the negative pressure apparatus is connected to the dust suction hood, and the negative pressure apparatus is used for forming a negative pressure in the dust suction hood.

In the above technical solution, by arranging the dust suction hood, the metal dust bouncing off the material belt will enter the space surrounded by the dust suction hood, thereby preventing the metal dust from bouncing off the dust suction hood to pollute the environment. Moreover, the metal dust is caused to be relatively close to the dust suction port, and is easy to be sucked away, thereby improving the dust suction effect.

In one embodiment of the present application, the dust suction hood includes a side wall, a top wall, and a connecting portion. The side wall surrounds the top wall, one end of the side wall is connected to the top wall, and the other end of the side wall forms the dust suction port, the connecting portion is arranged on the top wall, and the connecting portion is used for connecting the negative pressure apparatus.

In the above technical solution, a dust suction path is shortened by arranging the dust suction port and the connecting portion opposite to each other, thereby improving the dust suction effect.

In the second aspect, the embodiments of the present application provide a battery manufacturing device, including a conveying apparatus, a cutting apparatus, and the aforementioned dedusting apparatus. The conveying apparatus is used for conveying an electrode plate material belt, the cutting apparatus is used for cutting the electrode plate material belt, the dedusting apparatus is arranged downstream of the cutting apparatus, and the dedusting apparatus is used for removing dust on the surface of the electrode plate material belt.

In the above technical solution, by arranging the aforementioned dedusting apparatus in the battery manufacturing device, when the electrode plate material belt passes through the dedusting apparatus, the electrode plate and the metal dust adhered to the electrode plate are affected by an alternating magnetic field to generate an eddy current and form an induced magnetic field. Because the induced magnetic field is opposite to a magnetic field of the original magnetic mechanism, the electrode plate and the metal dust are subjected to a repulsive force away from the magnetic mechanism. The electrode plate has a large gravity and is further restricted by the dedusting mechanism, the conveying apparatus, and other devices to keep it in the original position, and the metal dust may bounce off the electrode plate under the action of repulsive force, so that the metal dust is capable of being sucked away by the dust suction mechanism. At the same time, the dust suction mechanism is also capable of sucking away other dust with a smaller weight, which effectively improves the dedusting effect and improves the final product quality of battery cells.

In the third aspect, the embodiments of the present application provide a dedusting method for removing dust on the surface of a material belt, including: arranging a dust suction mechanism on one side of the material belt, and arranging a magnetic mechanism on the other side of the material belt; generating an alternating magnetic field through the magnetic mechanism; and sucking away the dust on the surface of the material belt through the dust suction mechanism.

In the dedusting method provided by the present application, by arranging the magnetic mechanism and the dust suction mechanism opposite to each other on both sides of the material belt in the thickness direction, the dust is subjected to the action of the alternating magnetic field and the suction force at the same time, and the dust bounces off the surface of the material belt towards the dust suction mechanism. At the same time, the dust suction mechanism sucks away the dust that bounces off, thereby effectively reducing dust residue and improving the dedusting effect.

BRIEF DESCRIPTION OF THE DRAWINGS

In order to explain technical solutions of embodiments of the present application more clearly, a brief introduction of drawings to be used for describing the embodiments will be made below. It should be understood that, the following accompanying drawings merely show some embodiments of the present application, and should not be construed as limitation to the scope. Other related drawings can further be obtained according to these drawings by those of ordinary skill in the art without creative efforts.

Figure 1:
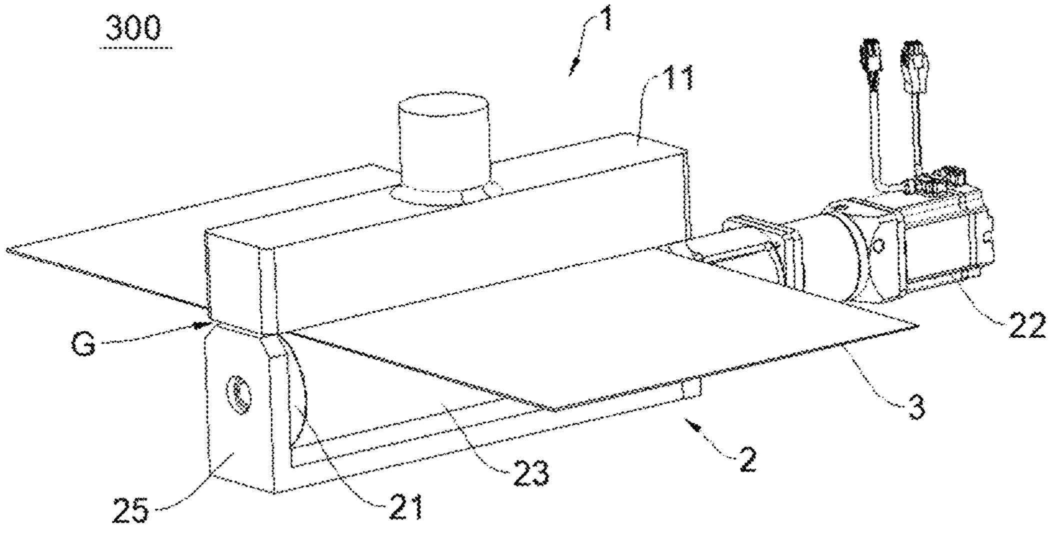
FIG. 1 is a three-dimensional diagram of a dedusting apparatus according to an embodiment of the present application.

Reference numerals: 1000—Battery manufacturing device; 100—Conveying apparatus; 200—Cutting apparatus; 300—Dedusting apparatus; 1—Dust suction mechanism; 11—Dust suction hood; 111—Dust suction port; 112—Side wall; 113—Top wall; 114—Connecting portion; 2—Magnetic mechanism; 21—Magnetic roller; 211—Roller main body; 212—Permanent magnet; 22—Driving assembly; 23—Bypass roller; 24—First bearing; 25—Mounting seat; 251—First end wall; 252—Second end wall; 253—Bottom wall; 26—Second bearing; 3—Material belt; and G—Gap.

DETAILED DESCRIPTION

In order to make objectives, technical solutions and advantages of the embodiments of the present invention clearer, the technical solutions in embodiments of the present application will be described clearly through the accompanying drawings in the embodiments of the present application the described embodiments are a part of embodiments of the present application, and are not all the embodiments. Based on the embodiments of the present application, all other embodiments derived by a person of ordinary skill in the art without any creative effort shall all fall within the protection scope of the present application.

Unless otherwise defined, all technical and scientific terms used herein have the same meaning as commonly understood by those skilled in the art to which the present application belongs. The terms used herein are for the purpose of describing specific embodiments only, and are not intended to limit the present application. The terms "include/comprise" and "have" and any variations thereof in the specification and claims of the present application as well as in the above description of drawings are intended to cover a non-exclusive inclusion. Terms such as "first" and "second" in the specification, the claims, and the accompanying drawings of the present application are used for distinguishing similar objects, and are not intended to describe a specific sequence or primary and secondary relations.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments.

In the description of the present application, it should be noted that the terms "mounting," "connecting," "connection," and "attachment" should be understood in a broad sense, unless otherwise explicitly specified or defined. For example, it may be a fixed connection, a detachable connection, or an integrated connection; and it may be a direct connection or an indirect connection through an intermediate medium, or may be a communication between the interior of two elements. For those of ordinary skill in the art, the specific meanings of the above terms in the present application can be understood according to specific situations.

In the present application, the term "and/or" is only an association relationship for describing associated objects, indicating that three relationships may exist. For example, A and/or B may represent three situations: A exists alone, both A and B exist, and B exists alone. In addition, the character "/" in the present application generally means that the associated objects before and after it are in an "or" relationship.

In the embodiments of the present application, the same reference numerals represent the same components, and for the sake of brevity, detailed descriptions of the same components are omitted in different embodiments. It should be understood that the thickness, length, width, and other dimensions of the various components in the embodiments of the application shown in the drawings, as well as the overall thickness, length, and width of the integrated apparatus, are for illustrative purposes only, and should not constitute any limitation to the present application.

In related technologies, dust is easy to adhere to the surface of a material belt. When the surface of the material belt has a coating layer, the dust is easily embedded in the coating layer and is difficult to remove. In order to facilitate removal of dust, methods adopted at present include blower dedusting, negative pressure dedusting, adhesion dedusting, and the like, or blower and negative pressure combined dedusting, that is, air is first blown to the surface of the material belt, and then a dust suction mechanism is used cooperatively to suck away the dust. The existing dedusting methods may have dead angles that are not easy to blow to, such as sides on both sides of the width of the material belt. Inappropriate magnitude and angle of the wind force may also cause some dust to be unable to be blown up, for example, metal dust has relatively high density and mass, so that the metal dust is still easy to remain on the surface of the material belt, which in turn leads to quality problems in the product of the material belt.

In view of this, in order to improve the dedusting effect, the present application provides a dedusting apparatus, the dedusting apparatus includes a dust suction mechanism and a magnetic mechanism, the magnetic mechanism is configured to be arranged opposite to the dust suction mechanism at an interval to form a gap, and the magnetic mechanism is used for generating an alternating magnetic field. When the material belt passes through the gap, metal dust is affected by the alternating magnetic field to generate an eddy current and form an induced magnetic field. Since the induced magnetic field is opposite to a magnetic field of the original magnetic mechanism, a mutual repulsive force occurs between the magnetic mechanism and the metal dust. The mutual repulsive force causes the metal dust to detach from the material belt or tend to detach from the material belt, thereby reducing an adhesive force between the metal dust and the material belt, and causing the metal dust easy to be sucked away by the dust suction mechanism. The dedusting apparatus provided by the present application is capable of generating the induced magnetic field as long as the metal dust is within the range of the alternating magnetic field of the magnetic mechanism, thereby reducing the adhesive force on the metal dust, and even causing the metal dust to bounce off from the material belt, effectively reducing the metal dust residue, and improving the dedusting effect.

The dedusting apparatus disclosed in the embodiments of the present application can be used for dedusting various types of material belts, and can be used for dedusting in processes of conveying, winding, cutting, and the like of the material belt. In the following, the material belt being an electrode plate is used as an example for description.

Figure 2:
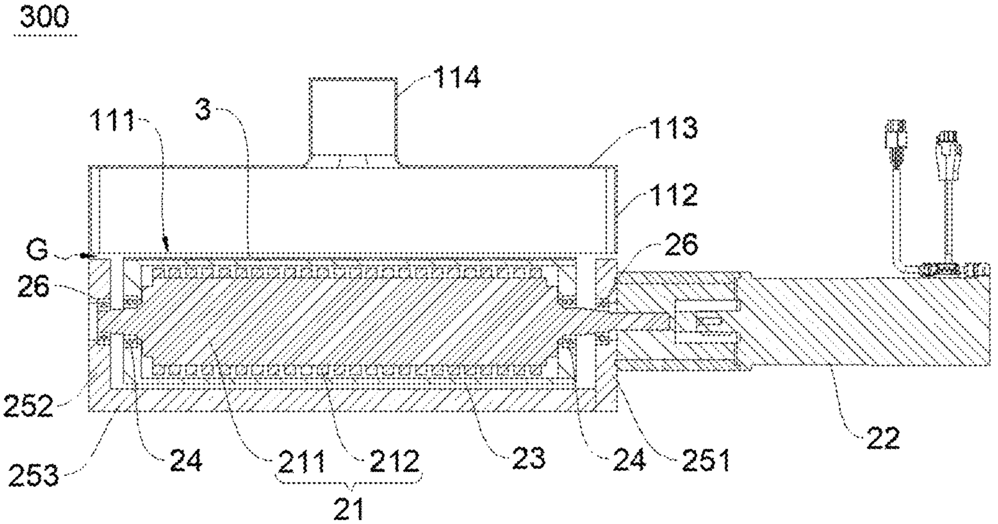
FIG. 2 is a cross-sectional diagram of a dedusting apparatus according to an embodiment of the present application.

FIG. 1 shows a three-dimensional diagram of a dedusting apparatus 300 according to some embodiments of the present application, and FIG. 2 shows a cross-sectional diagram of a dedusting apparatus 300 according to some embodiments of the present application. As shown in FIG. 1 and FIG. 2, the dedusting apparatus 300 includes a dust suction mechanism 1 and a magnetic mechanism 2, the magnetic mechanism 2 is arranged opposite to the dust suction mechanism 1 at an interval to form a gap G for a material belt 3 to pass through, and the magnetic mechanism 2 is used for generating an alternating magnetic field.

The dust suction mechanism 1 refers to a mechanism for providing negative pressure suction for sucking away metal dust.

The magnetic mechanism 2 refers to a mechanism capable of generating an alternating magnetic field. The magnetic mechanism 2 may generate the alternating magnetic field through a moving permanent magnet, or may generate the alternating magnetic field through a moving electromagnetic coil.

Figure 3:
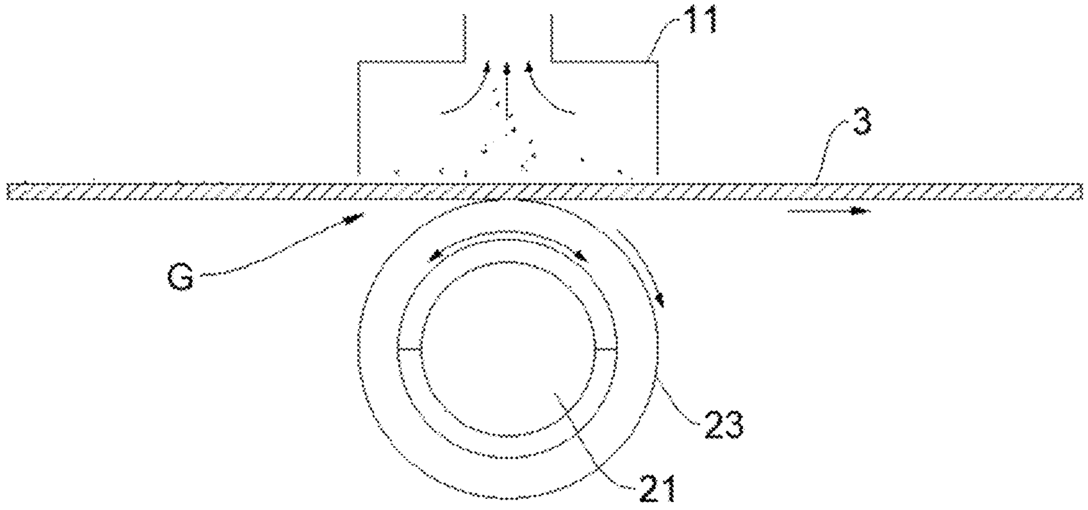
FIG. 3 is a working principle diagram of a dedusting apparatus according to an embodiment of the present application.

When the material belt 3 is an electrode plate, it generally has materials such as copper foil and aluminum foil, and the metal dust is generally non-magnetic metal dust such as copper powder and aluminum powder. FIG. 3 shows a working principle diagram of the dedusting apparatus 300. As shown in FIG. 3, when the alternating magnetic field acts on this type of metal dust, an eddy current is formed by induction in the metal dust, and the eddy current generates an induced magnetic field opposite in the direction to the original alternating magnetic field, so that a mutual repulsive force occurs between the magnetic mechanism 2 and the metal dust, and the mutual repulsive force causes the metal dust to bounce off from the material belt 3 or tend to bounce off from the material belt 3, thereby reducing an adhesive force between the metal dust and the material belt 3, and causing the metal dust easy to be sucked away by the dust suction mechanism 1.

The magnetic mechanism 2 and the dust suction mechanism 1 are respectively arranged on both sides of the material belt 3 in the thickness direction, and the magnetic mechanism 2 and the dust suction mechanism 1 are opposite to each other, so that the metal dust subjected to the action of the alternating magnetic field is simultaneously subjected to suction, and with the cooperation of the magnetic mechanism 2 and the dust suction mechanism 1 arranged opposite to each other, the metal dust bounces off the surface of the material belt 3 towards the dust suction mechanism 1, and at the same time, the dust suction mechanism 1 sucks the bounced metal dust away, thereby effectively reducing the metal dust residue and improving the dedusting effect.

On the other hand, in addition to the metal dust, the dust suction mechanism 1 is also capable of sucking away non-metal dust, thereby achieving a better dedusting effect and ensuring that the material belt 3 is clean.

It should be noted that the embodiment of the present application is described by taking the material belt 3 of the electrode plate as an example. For other types of metal dust on other types of material belts, the dedusting apparatus 300 provided in the embodiment of the present application is also capable of causing the metal dust to bounce off from the material belt 3 and to be sucked away, and non-metal dust is sucked away at the same time, thereby having a better dedusting effect.

According to some embodiments of the present application, the magnetic mechanism 2 includes a magnetic roller 21, and the magnetic roller 21, when rotating, generates an alternating magnetic field.

As shown in FIG. 2, the magnetic roller 21 includes a cylindrical roller main body 211 and a plurality of permanent magnets 212, and the plurality of permanent magnets 212 are arranged in sequence in a circumferential direction of the roller main body 211 and fixed on the roller main body 211. When the roller main body 211 rotates, the plurality of permanent magnets 212 rotate along with the roller main body 211, and magnetic poles of the permanent magnets 212 change to generate the alternating magnetic field.

By arranging the magnetic roller 21, the rotation of the magnetic roller 21 is capable of generating the alternating magnetic field, the overall structure is simple, and the reliability is high.

According to some embodiments of the present application, the magnetic mechanism 2 further includes a driving assembly 22, and the driving assembly 22 is used for driving the magnetic roller 21 to rotate.

As shown in FIG. 2, the driving assembly 22 includes a motor, and an output shaft of the motor is connected to one end of the magnetic roller 21 to drive the magnetic roller 21 to rotate around its own axis.

By arranging the driving assembly 22 to drive the magnetic roller 21 to rotate actively relative to the material belt 3, it is ensured that the magnetic roller 21 is capable of generating the alternating magnetic field and is high in reliability.

According to some embodiments of the present application, the magnetic mechanism 2 further includes a bypass roller 23, the bypass roller 23 is used for guiding the material belt 3 to move. The bypass roller 23 is of a hollow structure, and the bypass roller 23 rotatably sleeves the magnetic roller 21. A gap G is formed between the outer peripheral surface of the bypass roller 23 and the dust suction mechanism 1.

As shown in FIG. 2, the hollow structure means that the bypass roller 23 has a tubular structure. The bypass roller 23 rotatably sleeves the magnetic roller 21, that is, the bypass roller 23 and the magnetic roller 21 are capable of rotating relatively independently.

The bypass roller 23 rotates together with the material belt 3, thus achieving a good conveying effect. Moreover, the bypass roller 23 separates the magnetic roller 21 from the material belt 3, and the rotation of the magnetic roller 21 does not affect conveying of the material belt 3, thereby ensuring stable conveying and effective dedusting of the material belt 3.

On the other hand, the width of the material belt 3 on the bypass roller 23 will not be greater than the axial length of the bypass roller 23, that is, the axial length of the magnetic roller 21 will not be less than the material belt 3, so that the material belt 3 is entirely within a range of the alternating magnetic field of the magnetic roller 21 in the width direction, thereby ensuring the dedusting effect.

According to some embodiments of the present application, the magnetic mechanism 2 further includes a first bearing 24, and the magnetic roller 21 is connected to the bypass roller 23 through the first bearing 24.

As shown in FIG. 2, both ends of the bypass roller 23 are respectively provided with the first bearing 24, and the first bearing 24 is connected between an inner peripheral surface of the bypass roller 23 and the outer peripheral surface of the magnetic roller 21.

The first bearing 24 connects the magnetic roller 21 and the bypass roller 23 as a whole, the magnetic mechanism 2 is compact in the overall structure and easy to mount, the friction between the magnetic roller 21 and the bypass roller 23 is small, the rotation is flexible, and the reliability is high.

According to some embodiments of the present application, the magnetic mechanism 2 further includes a mounting seat 25, both ends of the magnetic roller 21 are rotatably connected to the mounting seat 25, and the driving assembly 22 is fixedly connected to the mounting seat 25.

As shown in FIG. 2, the mounting seat 25 includes a first end wall 251, a second end wall 252, and a bottom wall 253. The first end wall 251 and the second end wall 252 are relatively arranged on both sides of the width direction of the material belt 3. The bottom wall 253 is connected to one ends of the first end wall 251 and the second end wall 252 away from the dust suction mechanism 1.

By arranging the mounting seat 25, the rotation of the magnetic roller 21 is more stable, and the mounting seat 25 is also capable of playing a role of shielding, so as to alleviate the problem of environmental pollution caused by the metal dust bouncing off to the external space, and ensure the dust suction effect of the dust suction mechanism 1.

According to some embodiments of the present application, the dust suction mechanism 1 includes a dust suction hood 11 and a negative pressure apparatus (not shown), the dust suction hood 11 has a dust suction port 111 arranged towards the magnetic mechanism 2, the negative pressure apparatus is connected to the dust suction hood 11, and the negative pressure apparatus is used for forming a negative pressure in the dust suction hood 11.

As shown in FIG. 2, the dust suction port 111 of the dust suction hood 11 faces the magnetic mechanism 2 and hoods the material belt 3 from the above.

By arranging the dust suction hood 11, the metal dust bouncing off from the material belt 3 will enter the space surrounded by the dust suction hood 11, thereby preventing the metal dust from bouncing off from the dust suction hood 11 to pollute the environment. Moreover, the metal dust is caused to be relatively close to the dust suction port 111, and is easy to be sucked away, thereby improving the dust suction effect.

According to some embodiments of the present application, as shown in FIG. 2, the dust suction hood 11 includes a side wall 112, a top wall 113, and a connecting portion 114. The side wall 112 surrounds the top wall 113, one end of the side wall 112 is connected to the top wall 113, and the other end of the side wall 112 forms the dust suction port 111, the connecting portion 114 is arranged on the top wall 113, and the connecting portion 114 is used for connecting the negative pressure apparatus.

One end of the side wall 112 encloses to form the dust suction port 111, and the other end of the side wall 112 is connected to the top wall 113 to form a hood structure. An opening is formed on the top wall 113, and the connecting portion 114 is arranged on the opening. The connecting portion 114 is a tubular structure for causing the negative pressure apparatus to be in communication with the interior of the dust suction hood 11, so that the interior of the dust suction hood 11 is capable of forming a negative pressure environment through the negative pressure apparatus.

A dust suction path is shortened by arranging the dust suction port 111 and the connecting portion 114 opposite to each other, thereby improving the dust suction effect.

Figure 4:
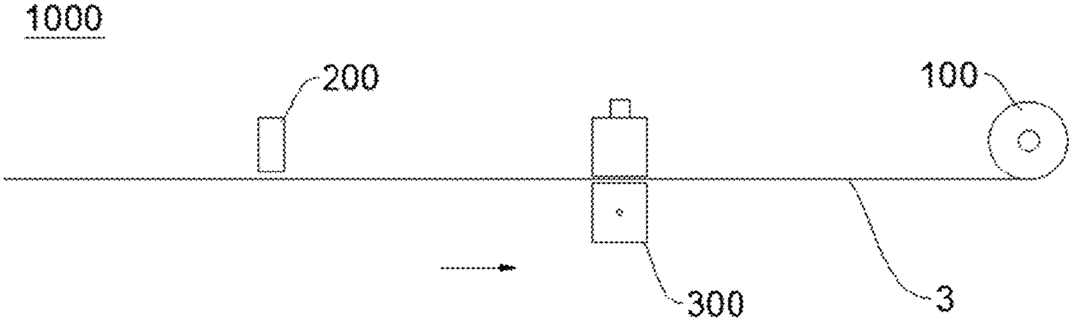
FIG. 4 is a schematic diagram of a battery manufacturing device according to an embodiment of the present application.

In the second aspect, the embodiments of the present application further provide a battery manufacturing device 1000. As shown in FIG. 4, the battery manufacturing device 1000 includes a conveying apparatus 100, a cutting apparatus 200, and the dedusting apparatus 300. The conveying apparatus 100 is used for conveying an electrode plate material belt 3, the cutting apparatus 200 is used for cutting the electrode plate material belt 3, the dedusting apparatus 300 is arranged downstream of the cutting apparatus 200, and the dedusting apparatus 300 is used for removing metal dust on the surface of the electrode plate material belt 3.

The electrode plate is one of the main constituent materials of an electrode assembly in a battery cell, and is classified into a positive electrode plate and a negative electrode plate. The battery cell includes the electrode assembly and an electrolyte solution, and the electrode assembly includes a positive electrode plate, a negative electrode plate, and a separator. The battery cell operates mainly relying on movement of metal ions between the positive electrode plate and the negative electrode plate. The positive electrode plate includes a positive electrode current collector and a positive electrode active material layer, and the positive electrode active material layer is coated on the surface of the positive electrode current collector. The positive electrode current collector includes a positive electrode current collecting portion and a positive tab protruding from the positive electrode current collecting portion. The positive electrode current collecting portion is coated with the positive electrode active material layer, and at least part of the positive tab is not coated with the positive electrode active material layer. Taking a lithium ion battery as an example, the material of the positive electrode current collector may be aluminum foil, the positive electrode active material layer includes a positive electrode active material, and the positive electrode active material may be lithium cobalt oxide, lithium iron phosphate, ternary lithium, lithium manganate, or the like. The negative electrode plate includes a negative electrode current collector and a negative electrode active material layer, and the negative electrode active material layer is coated on the surface of the negative electrode current collector. The negative electrode current collector includes a negative electrode current collecting portion and a negative tab protruding from the negative electrode current collecting portion. The negative electrode current collecting portion is coated with the negative electrode active material layer, and at least part of the negative tab is not coated with the negative electrode active material layer. The material of the negative electrode current collector may be copper foil, the negative electrode active material layer includes a negative electrode active material, and the negative electrode active material may be carbon, silicon, or the like. The separator is used for insulating and isolating the positive electrode plate and the negative electrode plate to avoid short circuit caused by overlapping of the two. The material of the separator may be a film made of polypropylene (PP) or polyethylene (PE). Before the electrode assembly is formed, it is necessary to cut out an electrode plate having a predetermined length on the material belt 3 of the electrode plate. Metal dust may inevitably appear in the cutting process of the electrode plate (for example, cutting the copper foil may generate copper powder, cutting the aluminum foil may generate aluminum powder, and the like). There will be a certain adsorption force between the metal dust and the electrode plate, and especially the metal dust is easy to be embedded into the active material layer coated on the surface of the electrode plate. It is difficult to remove the dust simply by blowing with compressed air or sucking the dust through negative pressure. The metal dust is also non-magnetic and cannot be attracted and removed by magnets. The metal dust adhering to the positive electrode plate and the negative electrode plate is easy to pierce the separator, resulting in a lap short circuit between the positive electrode plate and the negative electrode plate, resulting in a poor performance of the finished battery cell.

In the battery manufacturing device 1000 provided in the embodiments of the present application, by arranging the dedusting apparatus 300 provided in the aforementioned embodiment, when the electrode plate material belt 3 passes through the dedusting apparatus 300, the electrode plate and the metal dust adhered to the electrode plate are affected by an alternating magnetic field to generate an eddy current and form an induced magnetic field. Because the induced magnetic field is opposite to a magnetic field of the original magnetic mechanism 2, the electrode plate and the metal dust are subjected to a repulsive force away from the magnetic mechanism 2. The electrode plate has a large gravity and is further restricted by the conveying apparatus 100 and the like to keep it in the original position, and the metal dust may bounce off the electrode plate under the action of repulsive force, so that the metal dust is capable of being sucked away by the dust suction mechanism 1, which effectively improves the dedusting effect and improves the final product quality of battery cells.

In some embodiments, the magnetic mechanism 2 may be arranged below the gravity direction of the material belt 3, and the electrode plate will not move upward due to the gravity force, so that the metal dust with a small mass may easily get rid of restriction of its own gravity and adhesion to bounce away upward, thereby ensuring a better dedusting effect.

On the other hand, in the embodiment of the present application, there is only a gap G arranged between the magnetic mechanism 2 and the dust suction mechanism 1 for the electrode plate material belt 3 to pass through, which is also capable of restricting the electrode plate and preventing the electrode plate from moving upward due to the repulsive force, so that the metal dust is easy to be separated from the electrode plate, and the electrode plate is guaranteed to be stable and easy to transport.

For the structure of the dedusting apparatus 300 in the battery manufacturing device 1000 provided in the embodiment of the present application, reference may be made to the specific description of the foregoing embodiments. It should be noted that, without conflict, embodiments in the present application and features in the embodiments may be combined together.

Figure 5:
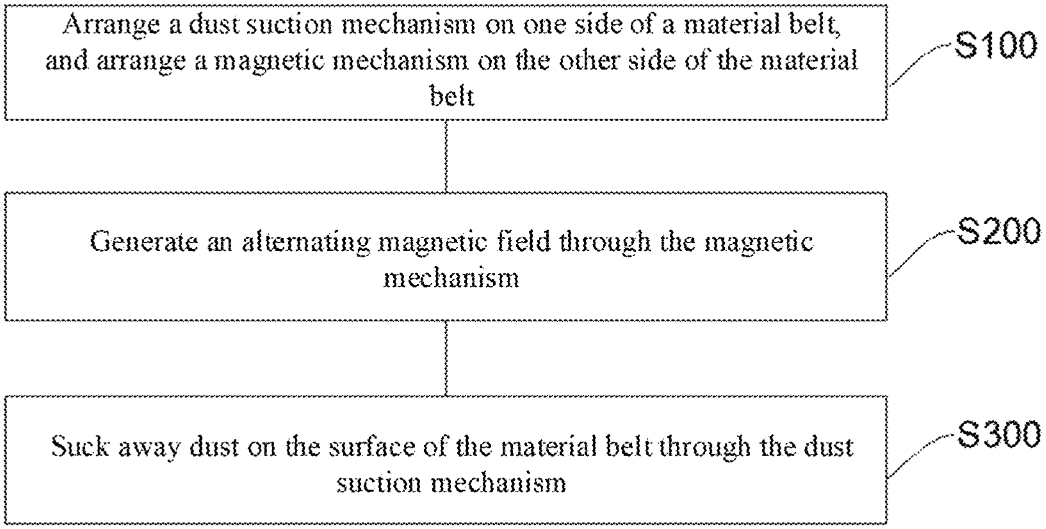
FIG. 5 is a block diagram of a process of a dedusting method according to an embodiment of the present application.

In the third aspect, the embodiments of the present application further provide a dedusting method, as shown in FIG. 5, for removing dust on the surface of the material belt 3. The dedusting method includes:

S100: arranging a dust suction mechanism 1 on one side of the material belt 3, and arranging a magnetic mechanism 2 on the other side of the material belt 3;

S200: generating an alternating magnetic field through the magnetic mechanism 2; and

S300: sucking away the dust on the surface of the material belt 3 through the dust suction mechanism 1.

For the structure of the dedusting apparatus 300 adopted in the dedusting method provided in the embodiment of the present application, reference may be made to the specific description of the foregoing embodiments. It should be noted that, without conflict, embodiments in the present application and features in the embodiments may be combined together.

According to some embodiments of the present application, and further referring to FIG. 1, FIG. 2, and FIG. 3, a dedusting apparatus 300 is provided in the embodiments of the present application, the dedusting apparatus 300 includes a dust suction mechanism 1 and a magnetic mechanism 2, the magnetic mechanism 2 is arranged opposite to the dust suction mechanism 1 at an interval to form a gap G for a material belt 3 to pass through, and the magnetic mechanism 2 is used for generating an alternating magnetic field. The magnetic mechanism 2 includes a mounting seat 25, a driving assembly 22, a magnetic roller 21, and a bypass roller 23. The mounting seat 25 includes a first end wall 251, a second end wall 252, and a bottom wall 253. The first end wall 251 and the second end wall 252 are relatively arranged on both sides of the width direction of the material belt 3. The bottom wall 253 is connected to one ends of the first end wall 251 and the second end wall 252 away from the dust suction mechanism 1. Both ends of the magnetic roller 21 are rotatably connected to the first end wall 251 and the second end wall 252 respectively through a second bearing 26 (referring to FIG. 2). The driving assembly 22 includes a motor, and the driving assembly 22 is mounted on the first end wall 251, and one end of the magnetic roller 21 connected to the first end wall 251 passes through the first end wall 251 to connect to the output shaft of the motor. The magnetic roller 21 includes a cylindrical roller main body 211 and a plurality of permanent magnets 212, and the plurality of permanent magnets 212 are arranged in sequence in a circumferential direction of the roller main body 211 and fixed on the roller main body 211. When the roller main body 211 rotates, the plurality of permanent magnets 212 rotate along with the roller main body 211, and magnetic poles of the permanent magnets 212 change to generate the alternating magnetic field acting on the metal dust. The bypass roller 23 rotatably sleeves the magnetic roller 21, and the bypass roller 23 is capable of rotating independently relative to the magnetic roller 21. The dust suction mechanism 1 includes a dust suction hood 11 and a negative pressure apparatus. The dust suction hood 11 includes a side wall 112, a top wall 113, and a connecting portion 114. The side wall 112 surrounds the top wall 113, one end of the side wall 112 is connected to the top wall 113, and the other end of the side wall 112 forms the dust suction port 111, the connecting portion 114 is arranged on the top wall 113, and the connecting portion 114 is used for connecting the negative pressure apparatus. The gap G for the material belt 3 to pass through is formed between the outer peripheral surface of the bypass roller 23 and the dust suction hood 11. When the material belt 3 passes through the gap G, the metal dust on the material belt 3 may bounce off from the material belt 3 under the action of the magnetic mechanism 2, and may be sucked away and removed under the action of the dust suction mechanism 1. In addition to the metal dust, the dust suction mechanism 1 is also capable of sucking away other non-metal dust, thereby playing a better dedusting effect and ensuring that the material belt 3 is clean.

The above descriptions are merely preferred embodiments of the present application, and are not intended to limit the present application. For persons skilled in the art, the present application may have various modifications and variations. Any modification, equivalent replacement, improvement or the like made within the spirit and principle of the present application should all fall within the protection scope of the present application.

What is claimed is:

1. A dedusting apparatus, for removing metal dust on a surface of a material belt, the material belt being an electrode plate material belt for a lithium-ion battery, the dedusting apparatus comprising:

a dust suction mechanism; and a magnetic mechanism, arranged opposite to the dust suction mechanism at an interval to form a gap for the material belt to pass through, wherein the magnetic mechanism comprises:

a magnetic roller configured to generate an alternating magnetic field when rotating and cause a metal dust on a surface of the material belt to generate an induced magnetic field opposite to the alternating magnetic field, so that the metal dust is subjected to a repulsive force and bounces off from the material belt for the dust suction mechanism to suck away;

a driving assembly comprising a motor configured to drive the magnetic roller to rotate, wherein the motor comprises an output shaft connected to one end of the magnetic roller; and a mounting seat, wherein both of two ends of the magnetic roller are rotatably connected to the mounting seat, and the driving assembly is fixedly connected to the mounting seat, wherein the mounting seat comprises a first end wall, a second end wall, and a bottom wall, wherein the first end wall and the second end wall are relatively arranged on both sides of the material belt along a width direction of the material belt, the bottom wall is connected to one end of the first end wall and one end of the second end wall, both of the two ends of the magnetic roller are rotatably connected to the first end wall and the second end wall respectively, the driving assembly is mounted on the first end wall, and one of the two ends of the magnetic roller connected to the first end wall passes through the first end wall to connect to the output shaft of the motor.

2. The dedusting apparatus according to claim 1, wherein the magnetic mechanism further comprises a bypass roller, the bypass roller is used for guiding the material belt to move, the bypass roller is of a hollow structure, the bypass roller rotatably sleeves the magnetic roller, and the gap is formed between an outer peripheral surface of the bypass roller and the dust suction mechanism.

3. The dedusting apparatus according to claim 2, wherein the magnetic mechanism further comprises a first bearing, and the magnetic roller is connected to the bypass roller through the first bearing.

4. The dedusting apparatus according to claim 1, wherein the dust suction mechanism comprises a dust suction hood and a negative pressure apparatus, the dust suction hood has a dust suction port arranged towards the magnetic mechanism, the negative pressure apparatus is connected to the dust suction hood, and the negative pressure apparatus is used for forming a negative pressure in the dust suction hood.

5. The dedusting apparatus according to claim 4, wherein the dust suction hood comprises a side wall, a top wall, and a connecting portion, the side wall surrounds the top wall, one end of the side wall is connected to the top wall, and the other end of the side wall forms the dust suction port, the connecting portion is arranged on the top wall, and the connecting portion is used for connecting the negative pressure apparatus.

6. A battery manufacturing device, comprising:

a conveying apparatus used for conveying an electrode plate material belt for a lithium-ion battery;

a cutting apparatus used for cutting the electrode plate material belt; and a dedusting apparatus arranged downstream of the cutting apparatus and used for removing dust on a surface of the electrode plate material belt, wherein the dedusting apparatus comprises:

a dust suction mechanism; and a magnetic mechanism, arranged opposite to the dust suction mechanism at an interval to form a gap for the material belt to pass through, wherein the magnetic mechanism comprises:

a magnetic roller configured to generate an alternating magnetic field when rotating and cause a metal dust on a surface of the material belt to generate an induced magnetic field opposite to the alternating magnetic field, so that the metal dust is subjected to a repulsive force and bounces off from the material belt for the dust suction mechanism to suck away;

a driving assembly comprising a motor configured to drive the magnetic roller to rotate, wherein the motor comprises an output shaft connected to one end of the magnetic roller; and a mounting seat, wherein both of two ends of the magnetic roller are rotatably connected to the mounting seat, and the driving assembly is fixedly connected to the mounting seat, wherein the mounting seat comprises a first end wall, a second end wall, and a bottom wall, wherein the first end wall and the second end wall are relatively arranged on both sides of the material belt along a width direction of the material belt, the bottom wall is connected to one end of the first end wall and one end of the second end wall, both of the two ends of the magnetic roller are rotatably connected to the first end wall and the second end wall respectively, the driving assembly is mounted on the first end wall, and one of the two ends of the magnetic roller connected to the first end wall passes through the first end wall to connect to the output shaft of the motor.

7. The battery manufacturing device according to claim 6, wherein the magnetic mechanism of the dedusting apparatus further comprises a bypass roller, the bypass roller is used for guiding the material belt to move, the bypass roller is of a hollow structure, the bypass roller rotatably sleeves the magnetic roller, and the gap is formed between an outer peripheral surface of the bypass roller and the dust suction mechanism.

8. The battery manufacturing device according to claim 7, wherein the magnetic mechanism of the dedusting apparatus further comprises a first bearing, and the magnetic roller is connected to the bypass roller through the first bearing.

9. The battery manufacturing device according to claim 7, wherein the dust suction mechanism of the dedusting apparatus comprises a dust suction hood and a negative pressure apparatus, the dust suction hood has a dust suction port arranged towards the magnetic mechanism, the negative pressure apparatus is connected to the dust suction hood, and the negative pressure apparatus is used for forming a negative pressure in the dust suction hood.

10. The battery manufacturing device according to claim 9, wherein the dust suction hood comprises a side wall, a top wall, and a connecting portion, the side wall surrounds the top wall, one end of the side wall is connected to the top wall, and the other end of the side wall forms the dust suction port, the connecting portion is arranged on the top wall, and the connecting portion is used for connecting the negative pressure apparatus.

* * * * *